United States Patent [19]
Sato

[11] Patent Number: 5,196,940
[45] Date of Patent: Mar. 23, 1993

[54] ELECTROMAGNETICALLY-DRIVEN AUTOMATIC IRIS DEVICE NOT REQUIRING SPEED DETECTING DAMPING COIL

[75] Inventor: Osamu Sato, Saitama, Japan

[73] Assignee: Canon Kabushiki Kaisha, Tokyo, Japan

[21] Appl. No.: 625,461

[22] Filed: Dec. 11, 1990

[30] Foreign Application Priority Data

Dec. 12, 1989 [JP] Japan ................................. 1-322024

[51] Int. Cl.$^5$ ............................................. H04N 5/238
[52] U.S. Cl. ..................... 358/228; 358/209; 358/909; 354/271.1
[58] Field of Search ............... 358/228, 209; 354/270, 354/271.1, 451, 452, 453, 439; 318/599, 280, 283, 289, 138; 250/229, 201.1, 205; 362/4, 16, 18, 321

[56] References Cited

U.S. PATENT DOCUMENTS

| | | | |
|---|---|---|---|
| 3,995,208 | 11/1976 | Parr | 318/612 |
| 4,084,893 | 4/1978 | Flandorfer | 352/141 |
| 4,325,614 | 4/1982 | Grimes | 354/437 |
| 4,651,068 | 3/1987 | Meshkat-Razavi | 318/254 |
| 4,998,129 | 3/1991 | Watanabe et al. | 354/452 |
| 5,047,796 | 3/1991 | Tagani et al. | 354/400 |
| 5,049,997 | 9/1991 | Arai | 358/213.11 |

FOREIGN PATENT DOCUMENTS

| | | |
|---|---|---|
| 55-105479 | 8/1980 | Japan . |
| 60-51374 | 3/1985 | Japan . |
| 62-38084 | 2/1987 | Japan . |
| 1-23236 | 1/1989 | Japan . |

Primary Examiner—Michael T. Razavi
Assistant Examiner—Tuan V. Ho
Attorney, Agent, or Firm—Robin, Blecker, Daley & Driscoll

[57] ABSTRACT

A light quantity adjusting device adjusts the quantity of light by moving a light quantity adjusting member by means of an electromagnetic driving part. The device includes a circuit arranged to drive the electromagnetic driving part by producing a pulse output at a period which is shorter than the time constant of the electromagnetic driving part.

27 Claims, 7 Drawing Sheets

ELECTROMAGNETICALLY-DRIVEN AUTOMATIC IRIS DEVICE NOT REQUIRING SPEED DETECTING DAMPING COIL

BACKGROUND OF THE INVENTION

1. Field of the Invention

This invention relates to a light quantity adjusting device to be used for a video camera or a still picture camera or more broadly to an optical apparatus such as a camera or the like.

2. Description of the Related Art

Figure 4:
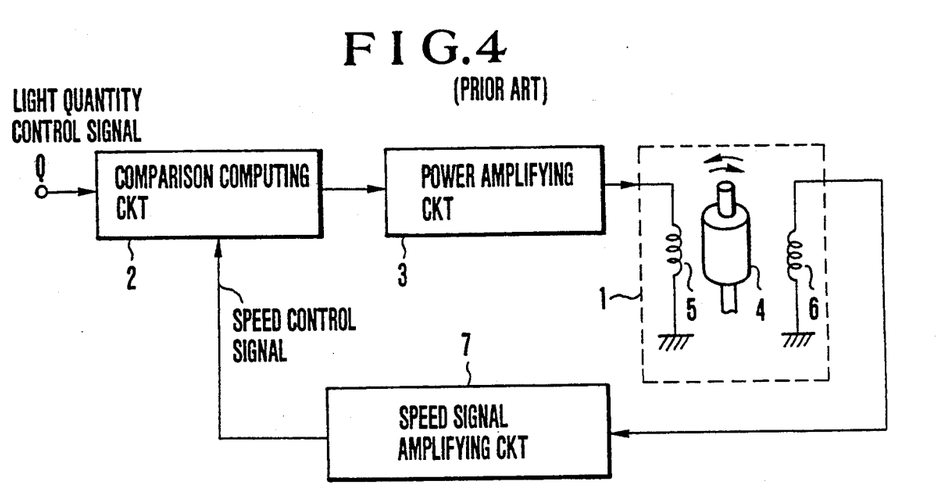
FIG. 4 shows the arrangement of the conventional device.
Figure 5:
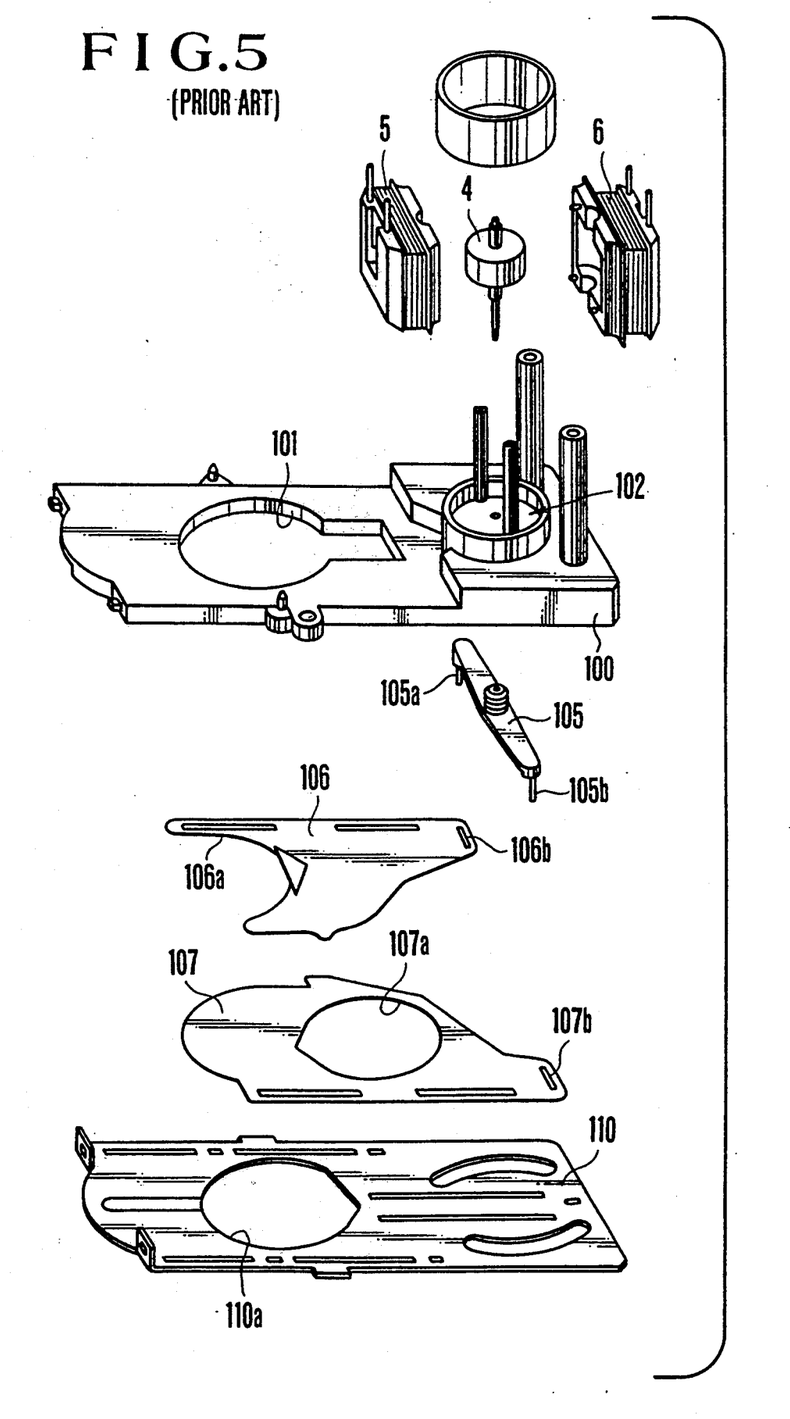
FIG. 5 is an oblique view showing the conventional iris unit.
Figure 8:
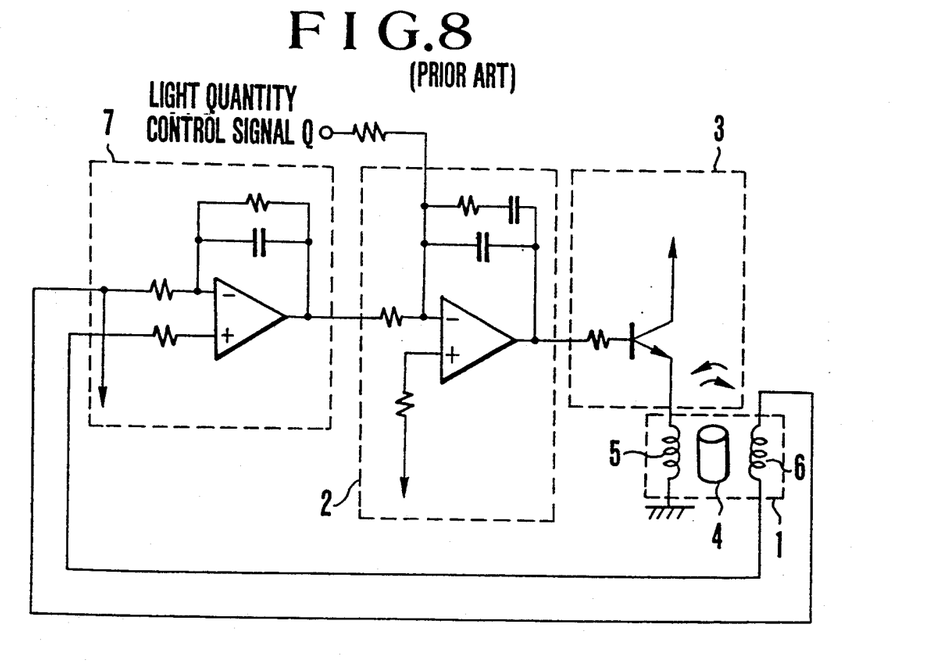
FIG. 8 is a circuit diagram showing by way of example the circuit of the conventional device shown in FIG. 4.

The video cameras and the still-picture film using cameras of these days are provided with automatic focusing devices and automatic light quantity adjusting devices such as automatic iris devices (hereinafter referred to as light quantity adjusting device). Generally, many of these light quantity adjusting devices are constructed on the basis of a closed-loop control system. The automatic iris device which is included in the video camera is also constructed on the basis of the closed-loop control system. FIGS. 4, 5 and 8 of the accompanying drawings show the control system of the conventional automatic iris device.

Referring to FIGS. 4 and 8, the rotor 4 of a motor part 1 is arranged to drive the diaphragm blades of the automatic iris device. A driving coil 5 is provided for rotating the rotor 4. A power amplifying circuit 3 is provided for controlling the current applied to the driving coil 5. A damping coil 6 is provided for detecting the rotating speed of the rotor 4. A speed signal amplifying circuit 7 is arranged to amplify the speed detection output of the coil 6. A light quantity control signal input terminal Q is arranged to receive a light quantity control signal which is, for example, a luminance signal included in a video signal. A comparison computing circuit 2 generates an output which is in proportion to a difference between a speed control signal output from the amplifying circuit 7 and the light quantity control signal. The driving coil 5, the rotor 4 and the damping coil 6 are included in the motor part 1.

The conventional automatic iris device is arranged to have the output of the coil 6 amplified by the speed signal amplifying circuit 7 and to have the amplified signal negatively fed back to the comparison computing circuit 2 as a speed control signal.

Referring to FIG. 5, a base plate 100 has an aperture 101 which allows a light flux to pass therethrough and a support part 102 on which the rotor 4 and the coils 5 and 6 are mounted. A driving lever 105 is secured to the rotating shaft of the rotor 4 and is arranged to swing accordingly as the rotor 4 rotates. A spring is arranged to constantly urge the driving lever 105 to move in the direction of closing the aperture. Diaphragm blades 106 and 107 are arranged to adjust the quantity of light by varying the area of aperture in a state of having apertures 106a and 107a coinciding with each other. A retaining plate 110 has an aperture 110a formed therein in such a way as to allow the light flux to pass therethrough.

The diaphragm blades 106 and 107 are slidably carried respectively between the base plate 100 and the retaining plate 110. The pins 105a and 105b of the driving lever 105 are inserted into slots 106b and 107b. This arrangement enables the swinging movement of the driving lever 105 to cause the diaphragm blades 106 and 107 to slide to vary the diaphragm aperture which is formed jointly by their apertures 106a and 107a.

The conventional automatic iris device which is arranged in the above-stated manner, however, has presented the following problems which must be solved:

(i) The device necessitates the provision of the speed detecting damping coil 6, which occupies a relatively large space. This not only increases the size of the device but also prevents reduction in cost.

(ii) The damping coil 6 and the driving coil 5 are disposed close to each other. Therefore, a change in a current applied to the driving coil 5 brings about a current at the coil 6 due to mutual induction. This current lowers the accuracy of the rotor speed detection signal produced by using the coil 6. Since the detection signal is negatively fed back to the driving coil 5, the control over the speed and the position of the rotor 4 tends to become unstable.

SUMMARY OF THE INVENTION

It is one aspect of this invention to provide a light quantity adjusting device or an optical apparatus having the light quantity adjusting device which is arranged to obviate the necessity of the speed detecting damping coil by energizing the above-stated driving coil with a rectangular pulse output of a period shorter than the time constant of electromagnetic driving means.

The above and other object and features of the invention will becomes apparent from the following detailed description of embodiments thereof taken in connection with the accompanying drawings.

DETAILED DESCRIPTION OF THE PREFERRED EMBODIMENTS

Figure 1:
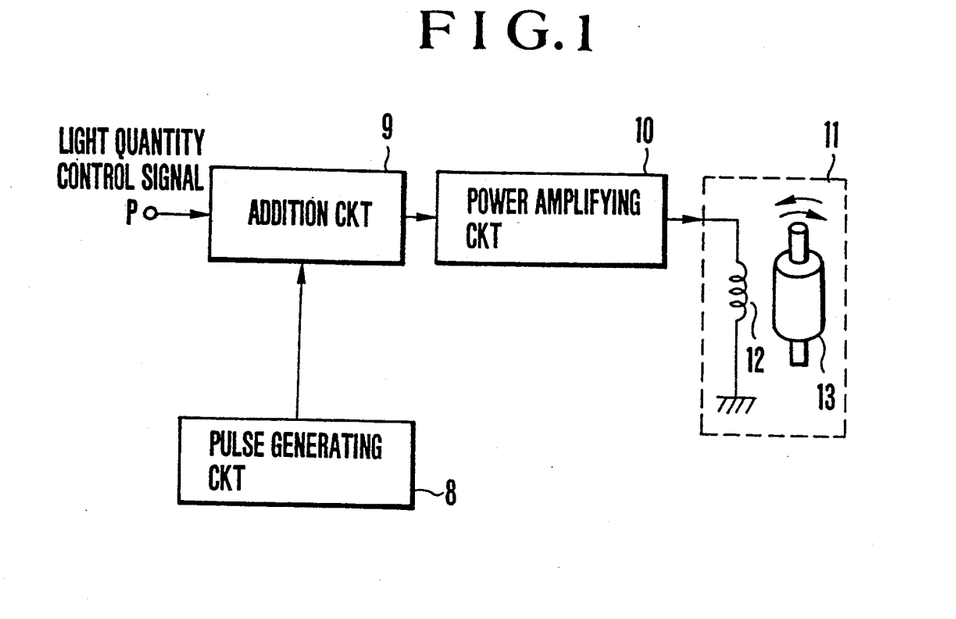
FIG. 1 is a block diagram showing the arrangement of a light quantity adjusting device embodying this invention.
Figure 7:
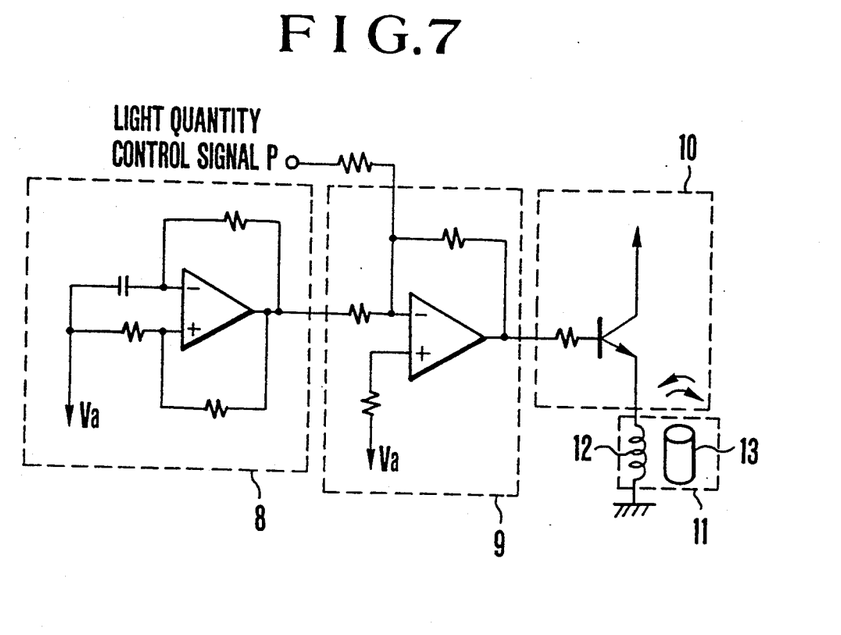
FIG. 7 is a circuit diagram showing by way of example the circuit of the arrangement shown in FIG. 1.

FIGS. 1 and 7 show the arrangement of a light quantity adjusting device which is arranged as a first embodiment of this invention. Referring to these drawings, a pulse generating circuit 8 consists of an operational amplifier, resistors and a capacitor. A light quantity control signal input terminal P is arranged to receive a light quantity control signal such as a luminance signal included in a video signal. An addition circuit 9 which consists of an operational amplifier and resistors is arranged to superpose on each other the light quantity control signal and the output signal of the pulse generating circuit 8. A power amplifying circuit 10 which consists of a transistor and a resistor is arranged to make the control signal output from the addition circuit 9 into a signal for driving the rotor 13 of a motor part 11. The motor part 11 is provided with a driving coil 12 for causing the rotor 13 to rotate in accordance with the output signal of the power amplifying circuit 10. The rotor 13 is magnetized to have N and S poles for driving a control member.

Figure 2:
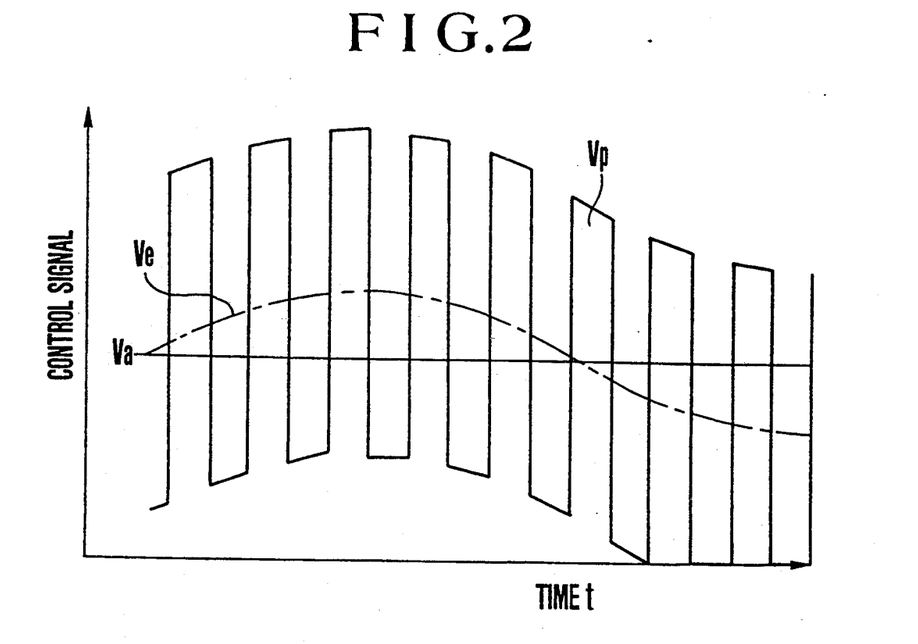
FIG. 2 is a graph showing the wave form of a driving control signal.

With the first embodiment of the invention arranged in the above-stated manner, it operates as follows: The light quantity control signal is, for example, a luminance signal included in the video signal as mentioned above. The output of the pulse generating circuit 8 is generated in a pulse wave form at a frequency higher than the time constant of the motor part 11 for moving the rotor 13 at a low speed by inchmeal. The light quantity control signal and the output of the pulse generating circuit 8 are superposed on each other by the addition circuit 9. As a result, the addition circuit 9 produces a control signal which is shown in FIG. 2. Referring to FIG. 2, a reference symbol Va denotes a reference control degree; a symbol Ve the light quantity control signal (one-dot chain line); and a symbol Vp a driving control signal which is obtained by adding the pulse wave form to the light quantity control signal Ve.

The output of the addition circuit 9 is amplified by the power amplifying circuit 10 and power is applied to the driving coil 12 accordingly. When the light quantity control signal Ve is equal to the reference control degree Va, the driving control signal Vp causes the rotor 13 to rotate forward or backward. However, since the period of the pulse wave form is much shorter than the time constant of the motor part 11, the rotor 13 remains stationary in actuality with a slight degree of vibration. A light quantity control member is thus accurately positioned. Further, the rotor 13 is urged by a spring to rotate in the direction of closing. The reference control degree Va is set at a value balanced with the force of the spring.

In a case where the light quantity control signal Ve is deviating from the reference control degree Va, the balance between the forward rotation and reverse rotation of the rotor 13 is lost and the rotor 13 is driven to rotate at a low speed in the forward or reverse direction. Then, the position of the light quantity control member is controlled at a low speed accordingly.

Figure 3:
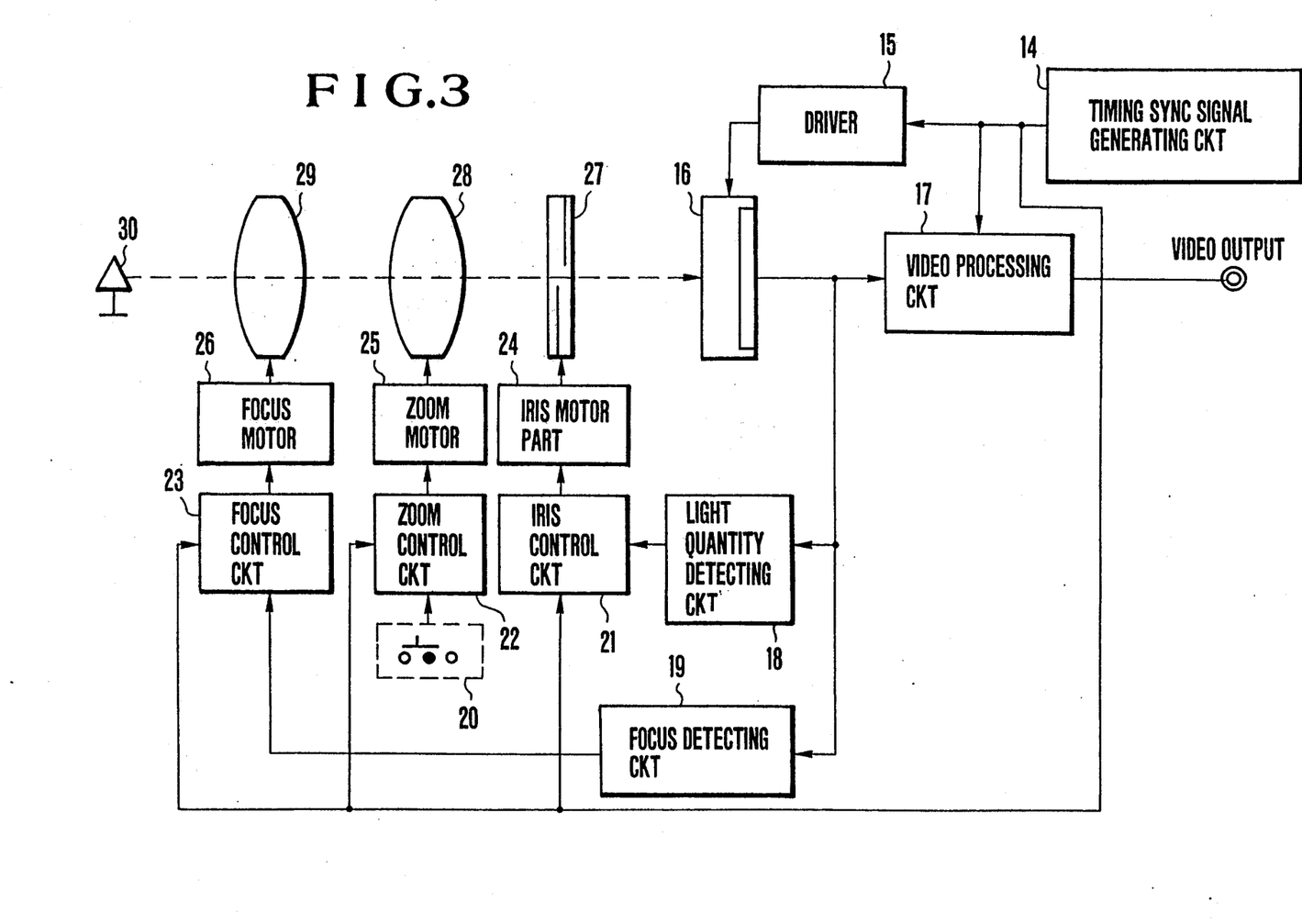
FIG. 3 is a block diagram showing the arrangement of a video camera to which this invention is applied.
Figure 6:
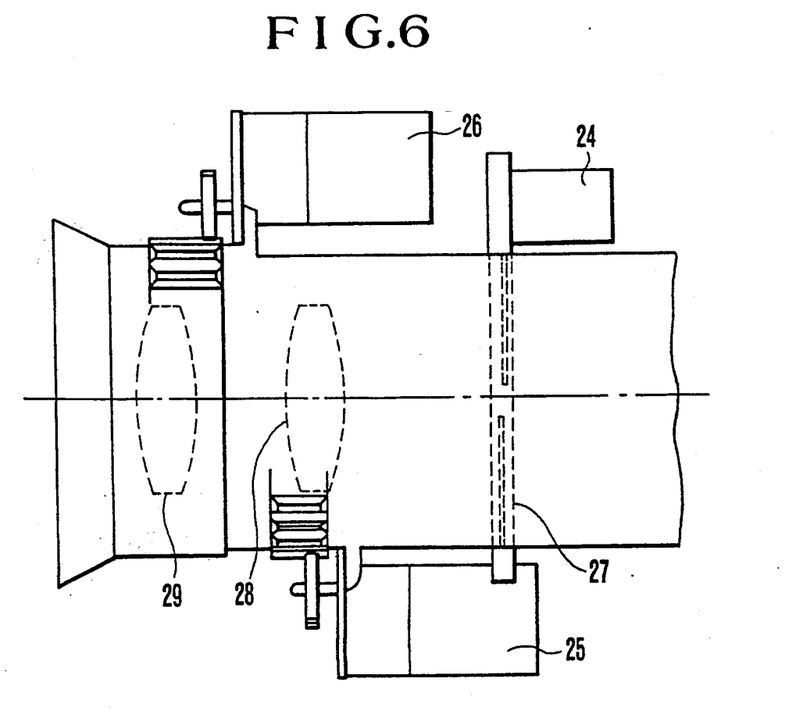
FIG. 6 is a side view showing the lens of a video camera.

FIGS. 3 and 6 show a video camera arranged according to this invention to control a plurality of light quantity adjusting devices by using a timing sync signal thereof. Referring to these drawings, the camera includes a timing sync signal generating circuit 14; a driver 15 which is arranged to drive a CCD 16 according to the timing of the timing sync signal generating circuit 14; the CCD 16 which is arranged to convert a light signal into an electrical signal; a video processing circuit 17 which is arranged to convert the output of the CCD 16 into a video signal in accordance with the output of the timing sync signal generating circuit 14; a light quantity detecting circuit 18 which is arranged to process the output of the CCD 16 into a light quantity control signal; a focus detecting circuit 19 which is arranged to process the output of the CCD 16 into a focus control signal; a manual switch 20 which is arranged to form a zoom control signal; an iris control circuit 21 which is arranged to form an iris driving signal by adding together the output of the timing sync signal generating circuit 14 and that of the light quantity detecting circuit 18; a zoom control circuit 22 which is arranged to form a zoom motor driving signal by adding together the output of the timing sync signal generating circuit 14 and that of the manual switch 20; a focus control circuit 23 which is arranged to form a focus motor driving signal by adding together the output of the timing sync signal generating circuit 14 and that of the focus detecting circuit 19; an iris motor part 24 which is arranged to drive and control a light quantity control member 27 by receiving the output of the iris control circuit 21; a zoom motor 25 which is arranged to drive and control a zoom lens 28 by receiving the output of the zoom control circuit 22; a focus motor 26 which is arranged to drive and control a focusing lens 29 by receiving the output of the focus control circuit 23; the light quantity control member 27 which is arranged to control the quantity of light incident on the CCD 16; the zoom lens 28 which is used for controlling the magnification of an image incident on the CCD 16; and the focusing lens 29 which is used for controlling the focus state of the image formed on the CCD 16. A reference numeral 30 denotes a picture-taking object.

In the embodiment described above, a light flux from the object 30 (a reflected light having video information) is imaged on the CCD 16 through the focusing lens 29, the zoom lens 28, the light quantity control member 27, etc. The CCD 16 converts the image into an electrical signal. The driver 15 drives the CCD 16 to serially produce the electrical signal in accordance with the output of the timing sync signal generating circuit 14. This signal is supplied to the video processing circuit 17 to be converted into a video signal in accordance with the output of the timing sync signal generating circuit 14. The output signal of the CCD 16 is supplied also to the light quantity detecting circuit 18 and the focus detecting circuit 19 to be processed into a light quantity control signal and a focus control signal respectively. Meanwhile, the manual switch 20 forms a zoom control signal. Each of the iris control circuit 21, the focus control circuit 23 and the zoom control circuit 22 forms the above-stated driving signal by adding the output of the timing sync signal generating circuit 14 to the applicable control signal. The driving signals thus formed cause the iris motor part 24, the focus motor 26 and the zoom motor 25 to move at a low speed by inchmeal respectively. The light quantity control member 27, the focus lens 29 and the zoom lens 28 are thus controlled with a high degree of accuracy.

Since a plurality of driving devices can be controlled by one and the same pulse signal, the arrangement of the embodiment permits circuit simplification. Further, the arrangement facilitates a countermeasure to noises by having the noises of the driving system such as a switching noise etc., at a single frequency.

In cases where the vertical sync signal of the video signal is used, a disorder in the image of one picture due to driving control over the quantity of light becomes unvarying for consecutive pictures. Therefore, the use of the vertical sync signal effectively prevents consecutive pictures from fluctuating and flickering.

Further, it is undesirable to have any sudden change in the image light quantity of such consecutive pictures that are obtained by the video camera. The light quantity is preferably controlled at a low speed. However, such a low speed control is difficult with a DC motor.

Whereas, the invented arrangement to move the motor at a low speed by inchmeal makes such low speed control possible.

Figure 9:
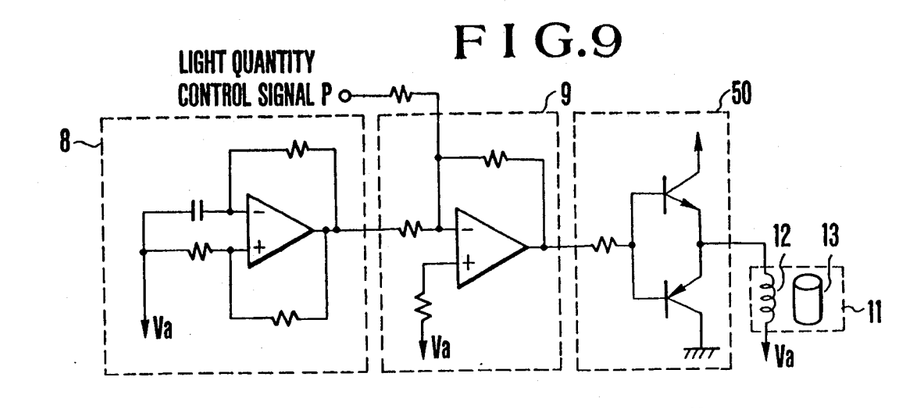
FIG. 9 is a circuit diagram showing by way of example the circuit of a second embodiment of this invention.

FIG. 9 shows the control circuit of a second embodiment of the invention. The second embodiment differs from the circuit arrangement of FIG. 7 in respect of the power amplifying circuit. Referring to FIG. 9, the power amplifying circuit 50 of the second embodiment is composed of two transistors and one resistor. The driving coil 12 is thus arranged to be excitable in different directions. The arrangement of the second embodiment is suited to a camera wherein the driving lever (see FIG. 5) is free and not urged by a spring in the direction of closing the aperture. In the case of the first embodiment, the driving action on the rotor 13 by exciting the coil 12 is arranged to move the rotor 13 only in the direction of opening the aperture while the rotor 13 is arranged to be rotatable in both directions through the balance with the spring force urging it in the direction of closing the aperture. Whereas, the second embodiment is arranged to rotate the rotor in both directions by switching the direction in which a current is applied to the driving coil 12 from one direction over to the other.

Figure 10:
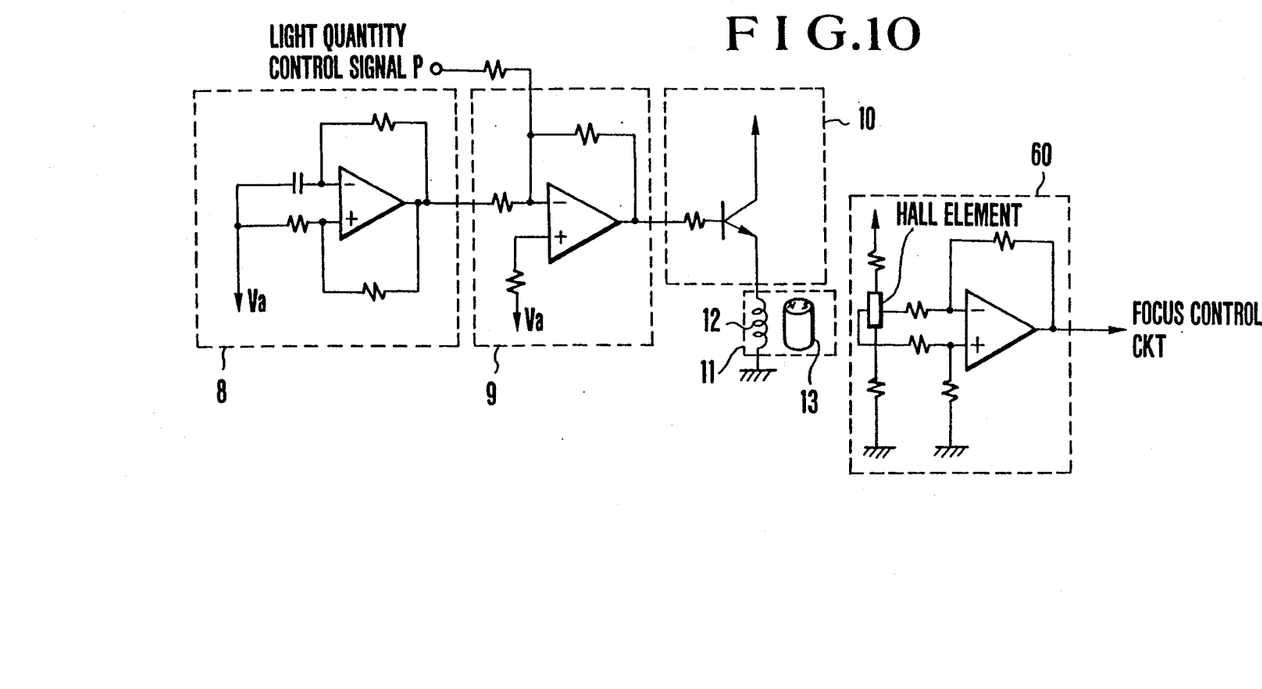
FIG. 10 is a circuit diagram showing by way of example the circuit of a third embodiment of the invention.

FIG. 10 shows the control circuit of a third embodiment of the invention. The arrangement of the third embodiment shown in FIG. 10 differs from FIG. 7 in that an F value detecting circuit 60 is added to the arrangement shown in FIG. 7. The term "F value" as used herein means the f-number of an optical system including the aperture of the light quantity control member (iris). The F value is changeable not only by a change in the aperture of the light quantity control member (iris) but also by the lens movement of the optical system. However, the F value is changeable to a greater degree by the change of the aperture of the light quantity control member than by the movement of the lens of the optical system.

The F value detecting circuit 60 is arranged to detect the rotating position (rotation angle) of the rotor 13 by means of a Hall element as a change in voltage and thus virtually detects the aperture value obtained by the sliding movement of the diaphragm blades. The F value detecting circuit 60 consists of the Hall element, a differential amplifier and resistors.

Figure 11:
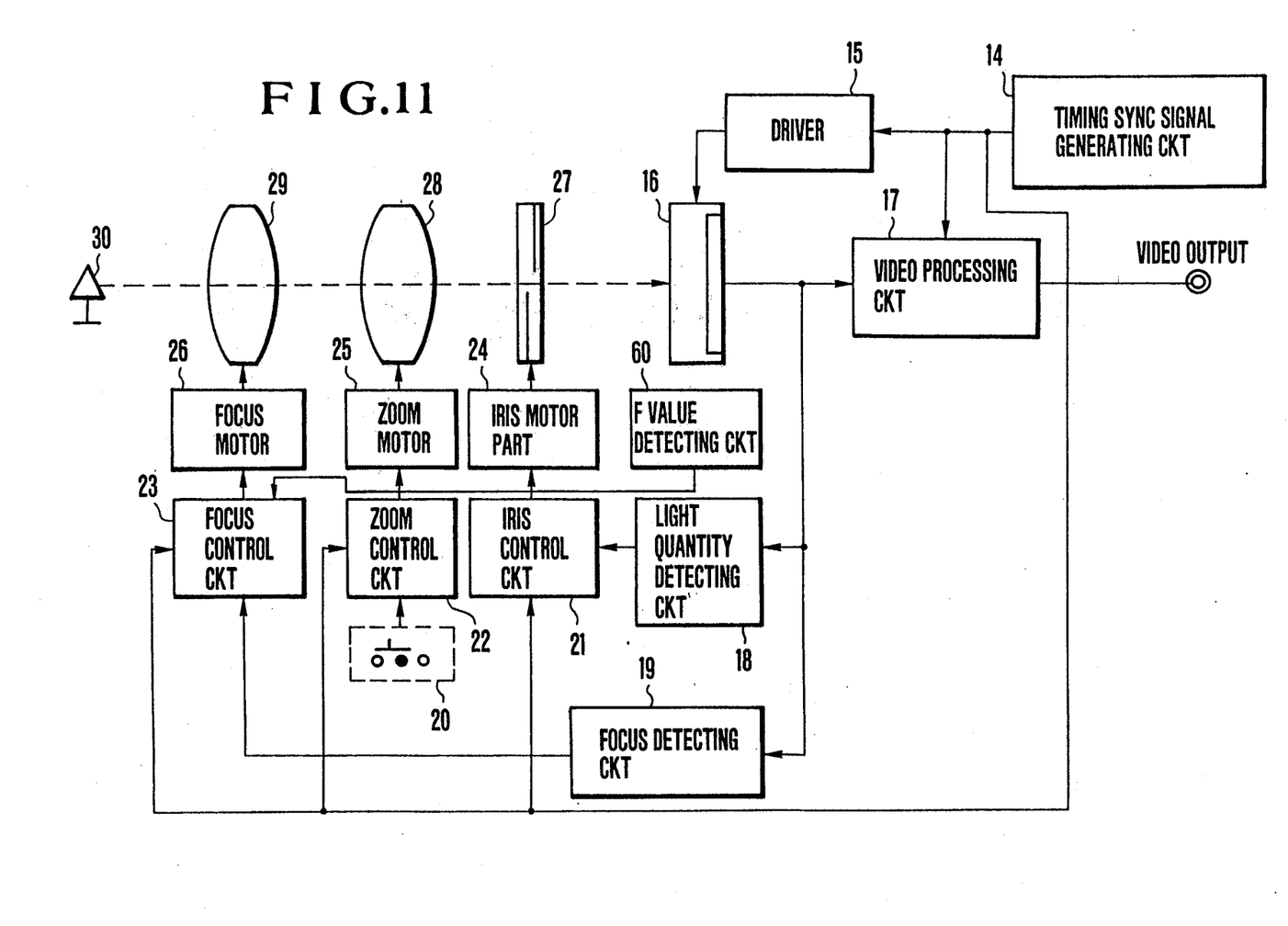
FIG. 11 is a block diagram showing a video camera to which the circuit of FIG. 10 is applied.

FIG. 11 shows a video camera which includes the control circuit shown in FIG. 10. The output of the F value detecting circuit 60 is supplied to a focus control circuit 23. The focus control circuit 23 is arranged to change its control over a focus motor 26 on the basis of F value information, because: The depth of field varies with the F value. If the F value is large, the object appears to be in focus to the eye of the camera operator even in the event of some deviation within the depth of field with a focusing lens 29 not in an in-focus position in actuality. In that case, it is not necessary to move the focusing lens 29.

As described in the foregoing, the embodiment is arranged to control the light quantity control member driving rotor to move it at a low speed by inchmeal by means of a driving control signal which is formed by adding to a light quantity control signal a continuous pulse wave form of a period which is shorter than the time constant of the motor. This arrangement dispenses with rotor rotation speed detecting means such as a damping coil. This permits reduction not only in size and weight of the apparatus but also in the cost of manufacture.

Since the invented device employs an open-loop control system, the control operation is simple and, unlike closed-loop control, can be accomplished without any instability that results from oscillation or the like. The adoption of the method of driving by inchmeal in switching prevents any adverse effect of switching noise and ensures stable control. Therefore, the quantity of light can be accurately controlled.

What is claimed is:

1. A light quantity adjusting device comprising:
   a) a light quantity adjusting member arranged to adjust a quantity of light;
   b) electromagnetic driving means for moving said light quantity adjusting member to adjust the quantity of light; and
   c) output generating means for supplying a driving output to said electromagnetic driving means, said output generating means being arranged to generate a pulse output at a period shorter than a time constant of said electromagnetic driving means, wherein said output generating means is arranged to generate said pulse output by adding to a pulse signal having a period shorter than a time constant of said electromagnetic driving means a target signal indicative of a desired quantity of light.

2. A device according to claim 1, wherein said electromagnetic driving means is composed of a driving coil and a magnet rotor.

3. A device according to claim 2, wherein said driving output is arranged to drive said driving coil only in one direction.

4. A device according to claim 2, wherein said driving output is arranged to drive said driving coil in respective opposite directions.

5. A device according to claim 2, further comprising detecting means for detecting a rotating position of said magnet rotor, said detecting means being arranged to detect a light-quantity value which is based on a moving position of said light quantity adjusting member by detecting the rotating position of said magnet rotor.

6. A device according to claim 5, wherein said detecting means includes a Hal element and is arranged to produce detected information as a voltage value.

7. A device according to claim 1, wherein said light quantity adjusting member is composed of diaphragm blades.

8. A device according to claim 7, wherein said light quantity adjusting member is arranged to adjust said quantity of light by moving a plurality of diaphragm blades to vary an aperture defined thereby.

9. A device according to claim 1, wherein said target signal is represented by a voltage value.

10. A device according to claim 1, further comprising detecting means for detecting a state of said light quantity adjusting member, said detecting means being arranged to detect a light-quantity value which is obtained on the basis of a moving position of said light quantity adjusting member.

11. A device according to claim 10, wherein said detecting means includes a Hall element and is arranged to produce detected information as a voltage value.

12. An optical apparatus having a light quantity adjusting device, comprising:
   a) an optical lens arranged to guide an object light to photo-electric converting means;
   b) a light quantity adjusting member disposed in the vicinity of said optical lens and arranged to adjust a quantity of light;

c) electromagnetic driving means for moving said light quantity adjusting member to adjust the quantity of light; and d) light quantity detecting means for detecting the quantity of light incident on said photo-electric converting means; and e) output generating means for supplying a driving output to said electromagnetic driving means on the basis of information obtained from said light quantity detecting means, said output generating means being arranged to generate a pulse output at a period shorter than a time constant of said electromagnetic driving means, wherein said output generating means is arranged to generate said pulse output by adding to a pulse signal having a period shorter than a time constant of said electromagnetic driving means a target signal indicative of a desired quantity of light obtained on the basis of information from said light quantity detecting means.

13. An optical apparatus according to claim 12, wherein said electromagnetic driving means is composed of a driving coil and a magnet rotor.

14. An apparatus according to claim 13, wherein said driving output is arranged to drive said driving coil only in one direction.

15. An apparatus according to claim 13, wherein said driving output is arranged to drive said driving coil in respective opposite directions.

16. An apparatus according to claim 13, further comprising detecting means for detecting a rotating position of said magnet rotor, said detecting means being arranged to detect a light-quantity value which is based on a moving position of said light quantity adjusting member by detecting the rotating position of said magnet rotor.

17. An apparatus according to claim 16, wherein said detecting means includes a Hall element and is arranged to produce detected information as a voltage value.

18. An apparatus according to claim 16, further comprising focus control means arranged to perform focus control on the basis of information obtained from said detecting means.

19. An apparatus according to claim 12, further comprising a video processing circuit arranged to convert an output of said photo-electric converting means into a video signal in accordance with a timing signal.

20. An apparatus according to claim 19, wherein said pulse output generated by said output generating means is of a period which is determined by using a period of said timing signal used by said video processing circuit.

21. An apparatus according to claim 20, wherein said timing signal is arranged to coincide with a vertical synchronizing signal.

22. An apparatus according to claim 12, wherein said light quantity adjusting member is composed of diaphragm blades.

23. An apparatus according to claim 22, wherein said light quantity adjusting member is arranged to adjust said quantity of light by moving a plurality of diaphragm blades to vary an aperture defined thereby.

24. An apparatus according to claim 12, wherein said target signal is represented by a voltage value.

25. An apparatus according to claim 12, further comprising detecting means for detecting a state of said light quantity adjusting member, said detecting means being arranged to detect a light-quantity value which is obtained on the basis of a moving position of said light quantity adjusting member.

26. An apparatus according to claim 25, wherein said detecting means includes a Hall element and is arranged to produce detected information as a voltage value.

27. An apparatus according to claim 25, further comprising focus control means arranged to perform focus control on the basis of information obtained from said detecting means.

* * * * *

UNITED STATES PATENT AND TRADEMARK OFFICE
CERTIFICATE OF CORRECTION

PATENT NO. : 5,196,940
DATED : March 23, 1993
INVENTOR(S) : Osamu Sato

It is certified that error appears in the above-indentified patent and that said Letters Patent is hereby corrected as shown below:

Col. 2, line 28. Change "object" to -- objects --
Col. 5, line 6. Change "of" to -- to --
Col. 6, line 42. Change "Hal" to -- Hall --

Signed and Sealed this

Thirty-first Day of May, 1994

Attest:

BRUCE LEHMAN

*Attesting Officer*  *Commissioner of Patents and Trademarks*